Patented June 17, 1930

1,765,015

UNITED STATES PATENT OFFICE

ERNEST HOPKINSON, OF NEW YORK, AND MERWYN C. TEAGUE, OF ELMHURST, NEW YORK, ASSIGNORS TO AMERICAN RUBBER COMPANY, OF EAST CAMBRIDGE, MASSACHUSETTS, A CORPORATION OF MASSACHUSETTS

PROCESS FOR TREATING RUBBER LATEX, COMPOSITION AND ARTICLE FORMED THEREBY

No Drawing.   Application filed August 18, 1923.   Serial No. 658,183.

This invention relates to processes for preparing compositions of rubber latex which may be used to produce various articles and also as a paint or similar coating material. It also relates to the compositions produced and articles formed thereby.

Rubber latex is a milky liquid obtained from the rubber tree—usually *Hevea Brasiliensis*—. The rubber which it contains has in the past been secured by coagulation by acid or otherwise and the rubber so recovered has been mixed with various compounding ingredients and converted into various rubber articles. It has also been proposed to mix with latex certain substances with subsequent coagulation and recovery of rubber mixed with the added substances. It has also been proposed to use so-called rubber cements combined with certain substances from which the volatile solvent used to make the cement has been evaporated to produce a combination of rubber and the added substance. The production of crude rubber by coagulation with subsequent mixture of ingredients entails various handlings, such as washing, milling, etc., which are expensive and in addition a certain portion of the constituents of the rubber is lost during the process. When ingredients are added to rubber latex and coagulation is carried out the resulting rubber mixture is apt to be unhomogeneous due to the difficulty of distributing substances uniformly throughout the latex and maintaining this distribution. In addition some of the ingredients as well as certain constituents of the latex are lost in the serum which results on coagulation and also considerable handling of the materials is necessary during the process. In the use of rubber cements about the same objections occur as in the use of raw rubber, and in addition where benzol, solvent naphtha or gasoline—the usual solvents used for making these cements—is used there is a fire hazard as well as a danger from the toxicity of these solvents.

This case is a continuation in part of application Serial No. 538,130, filed February 20, 1922.

The objects of the present invention accordingly are to do away with the disadvantages of these prior processes and compositions and to provide a simple, efficient process for the preparation of compositions of rubber and various ingredients; to provide a series of inexpensive, useful compositions from which articles may be readily formed; and to produce articles at less cost and with improved properties.

The invention accordingly comprises a process for preparing compositions of rubber latex which includes making an uncoagulated mixture with rubber latex of materials in proportions and of a character to modify a plurality of the properties, viscosity, adhesiveness, cohesiveness, plasticity and surface tension of latex in a predetermined manner, disposing the mixture in a predetermined form, and drying it with retention of the solid constituents of the latex. It also comprises the compositions and articles formed thereby.

The expression "uncoagulated mixture with rubber latex" employed in the specification and claims is intended to indicate a mixture in which substantially no separation or loss of serum, containing soluble constituents of the latex, from the remaining portion of the latex occurs.

As one specific example of the invention, an emulsion of 6 parts of water, 4 parts of medium mineral oil, for example spindle oil, and 0.1 part of potassium oleate is formed and added to latex in the proportion of 0.1 part of the emulsion to 1 part of a solid content of the latex. The latex contains 1–2% ammonia. 4 parts of straw by weight are treated with 1.1 part of the combination of rubber and oil. The mass is mixed in any suitable vessel and while still wet is preferably roughly assembled together in about the desired shape so that on pressing the desired density is obtained. The material is allowed to air dry or may be dried at an elevated temperature. If desired assembly may occur immediately after drying of the combination of straw and latex. In the example just given the straw modifies the plasticity, viscosity and cohesiveness increasing each of these properties as compared with the original latex. The oil increases the adhesiveness of the mass. The potassium oleate modifies the surface tension of the latex.

The dried mass is now compressed to a desired density, if in sheet form, by any convenient type of press such as used in the manufacture of belts. It may be vulcanized if desired, and in such case the vulcanizing agents mentioned in the succeeding example may be employed or the vulcanization may be accomplished in any other suitable manner. The pressed sheets may be sawed or otherwise machined to shape and may be varnished or otherwise coated if desired. To insure a uniform coloring throughout, the straw may be previously colored by dyeing or otherwise.

Instead of straw, hay, excelsior, grass and materials of this type may be similarly employed. The latex used may be in the form of undiluted normal latex containing approximately 30% by weight of dry rubber or may be in the form of a more dilute latex or in the form of latex butter containing a higher percentage of dry rubber through concentration.

The sheets obtained by the process mentioned are characterized by a low specific gravity, namely about 0.7 at ordinary temperature, are of pleasing appearance and sufficiently porous to permit air to pass therethrough. The facility with which air passes through is dependant upon the porosity of the material. The material is heat insulating. These characteristics make the product suitable for use as interior structural materials such as for tiling, wall coverings, wainscoting, panels, silence cloths. They are also useful for flooring material, for boxes, backings for floors, etc. The materials made as above described are in general stiff and have a low resiliency.

Another type of material which resembles cork in its characteristics having varying degrees of porosity, and other characteristics usually attendant upon such a porous structure is preferably made from the following materials:

| | Parts by weight |
|---|---|
| Dry rubber (mixed as latex) | 100 |
| Fine wood flour (or similar cellulose filler) | 300 |
| Zinc oxide | 20 |
| Sulphur | 3 |
| Dibenzylamine | 3 |
| Zinc butylxanthogenate | 3 |
| Light hydro-carbon oil such as solvent naptha | 100 |
| 2% soap solution | 100 |
| Water | 50 |

The order of adding the materials is preferably as follows: fine wood flour is placed in the mixer along with zinc oxide, sulphur and solvent naphtha. To these is added the dilute soap solution and additional water together with the latex, the soap solution being employed to improve the blending of the oil and water. Where ammonia preserved latex has been employed the mixture is heated for a few minutes to remove ammonia and this heating always hastens the blending. The mixture is then cooled and the zinc butylxanthogenate, and dibenzylamine are then added.

The ingredients are added in a Werner-Pfleiderer or similar mixer and the whole thoroughly mixed, whereupon the compound is removed and formed into wet sheets by means of an even speed mill, calender, tuber, or some similar device. The sheets are now heated at approximately 180° F., so that drying may be accomplished efficiently without however forming blisters. After drying the compound may be pressed in a belt press or by similar means if desired. While in the belt press a steam pressure of 30 lbs. per sq. in. is applied to the compound for 10 minutes whereupon vulcanization is complete.

The cellulose material, wood flour, is useful for the absorption of the water added and this water during the process of drying results in the formation of pores through rapid liberation thereof. The solvent naphtha maintains a uniform distribution of the rubber and preserves the rubber in a soft condition so as to permit water vapor evolved by the heat to readily pass therethrough, causing the fine pores desired. The heat, preferably 180° F. is such that the formation of blisters is avoided and yet a sufficiently rapid evolution of moisture is obtained so that the pores are formed. In the above formula the wood flour, zinc oxide, sulphur, dibenzylamine, and zinc butylxanthogenate raise the viscosity, plasticity, and cohesiveness of the mixture. The solvent naphtha which is emulsified with the soap solution raises the adhesiveness of the mass and also raises the cohesiveness as well. The soap solution modifies the surface tension of the latex as in the preceding example.

The material obtained by combining the above ingredients has a density of .48–1.00 at approximately 70° F. The estimated gravity of the solid material is approximately 1.3 at approximately 70° F., thus indicating the very porous character of the mass. This material is particularly useful as a flooring material, such as cork tile. It is soft yet resilient, conducts heat poorly and hence has good insulating properties, has high resistance to friction and abrasion and high tensile strength. It is not injured by the application of water and ordinary cleansing agents thereto.

Materials of various degrees of porosity may be formed by varying the manner of heating the mixture used for forming the article. The process just recited employs a dry heat at approximately 180° F. If instead of this dry heat, the material after being formed into the article is subjected to treatment in open steam at a steam pressure of 5 lbs. per square inch approximately, and drying effected thereby, a more porous material is secured than where dry heat at 180° F. is employed. This increase in porosity is due to a more rapid liberation of the volatile materials occasioning the formation of a larger number of pores or pores of greater size and due in part perhaps to steam distillation of the solvent naphtha or other solvent employed whereby through the well-known action of steam distillation the solvent is removed at a lower temperature than its boiling point.

It will be understood that latex, concentrated or diluted or with normal rubber content may be employed and that various other cellulose materials or similar materials to wood flour may be used or the various compounding ingredients including the vulcanizing agent may be changed as desired, that other solvents than solvent naphtha may be employed and various other agents than soap solution to effect the union of water and solvent naphtha may be used.

Compositions of latex and casein which may be used for forming articles directly may be prepared according to the present invention as follows:—100 parts of latex butter containing for example 50% of dry rubber are mixed with 300 parts of wood flour, 3 parts sulphur and 25 parts carbon black. 100 parts by weight of casein are hydrolized by treatment with 100 parts by volume of ammonium hydroxide and then are mixed with the above mass. This mixture is dried and then pressed in a mold of the plunger type to produce tiles, flooring materials, etc. The articles formed by the above process may or may not be vulcanized as desired. The casein increases the viscosity, plasticity, cohesiveness, and adhesiveness. The wood flour increases chiefly the viscosity and plasticity, and the carbon black increases the plasticity.

Various fillers such as those mentioned, zinc oxide, etc. may be employed if desired, or they may be omitted. The material obtained by the process just above is one that has considerable hardness combined with relatively low specific gravity.

The process is a simple, efficient one. A modification of the various properties, plasticity, viscosity, cohesiveness, adhesiveness and surface tension make possible the production of a homogeneous mass in which the various ingredients added remain suspended without difficulty and upon drying retain not only these ingredients but the various naturally occurring ingredients of the latex. The alteration of the viscosity and surface tension permit the production and maintenance of a substantially homogeneous mass. The modification of the plasticity permits the composition to be readily shaped. The modification of the cohesiveness serves to change the strength of the resulting articles, and the change in the adhesiveness improves the ability of the compound to form strong bonds.

As many apparently widely different embodiments of this invention may be made without departing from the spirit thereof, it will be understood that we do not intend to limit ourselves to the specific embodiments here employed except as indicated in the appended claims.

Having thus described our invention, what we claim and desire to protect by Letters Patent is:

1. A process for preparing articles from rubber latex which comprises making an uncoagulated mixture therewith of cellulose material, a vulcanizing agent, and a colloidal material, and drying the mixture with retention of the solid constituents of the latex.

2. A process for preparing rubberized material from rubber latex which comprises making an uncoagulated mixture with rubber latex of materials including a colloid and a vulcanizing agent, disposing the mixture in a predetermined form, drying with retention of the solid constituents of the latex and vulcanizing the mixture.

3. A new composition comprising a dried mixture of the solid constituents of latex, vulcanizing material, a filler and a colloid.

4. A new composition comprising a dried mixture of the solid constituents of latex, vulcanizing material, cellulose material, and a colloid.

Signed at New York, New York, this 14 day of August, 1923.

ERNEST HOPKINSON.
MERWYN C. TEAGUE.